US009197744B2

(12) United States Patent
Sittin et al.

(10) Patent No.: US 9,197,744 B2
(45) Date of Patent: Nov. 24, 2015

(54) CALL RECORDING WITH INTERACTION METADATA CORRELATION

(71) Applicant: NICE-SYSTEMS LTD., Ra'anana (IS)

(72) Inventors: Yuval Sittin, Tel-Aviv (IS); Efim Kolodizner, Ashdod (IS); Tal Zur, Rishon-Lezion (IS); Shlomi Levi, Kfar Saba (IS); Omer Kochba, Hod Hasharon (IS); Tal Obsfeld, Tel-Aviv (IS); Dorit Youda, Rishon Lezion (IS); Roni Krivoshey, Ramat Hasharon (IS)

(73) Assignee: NICE-SYSTEMS LTD., Ra'anana (IL)

( * ) Notice: Subject to any disclaimer, the term of this patent is extended or adjusted under 35 U.S.C. 154(b) by 111 days.

(21) Appl. No.: 14/145,381

(22) Filed: Dec. 31, 2013

(65) Prior Publication Data
US 2015/0189078 A1 Jul. 2, 2015

(51) Int. Cl.
*H04M 1/64* (2006.01)
*H04M 3/42* (2006.01)

(52) U.S. Cl.
CPC .... *H04M 3/42221* (2013.01); *H04M 2203/556* (2013.01)

(58) Field of Classification Search
CPC combination set(s) only.
See application file for complete search history.

(56) References Cited

U.S. PATENT DOCUMENTS

| 4,958,367 | A | 9/1990 | Freer et al. |
| 6,246,752 | B1 * | 6/2001 | Bscheider et al. ......... 379/88.22 |
| 6,252,946 | B1 * | 6/2001 | Glowny et al. ............ 379/88.22 |
| 7,409,054 | B2 * | 8/2008 | Galvin .................... H04M 3/51 379/265.03 |
| 7,502,448 | B1 * | 3/2009 | Elman ................... H04M 1/656 379/68 |
| 7,953,219 | B2 * | 5/2011 | Freedman .............. G06Q 30/02 379/265.06 |
| 8,249,244 | B2 * | 8/2012 | Naparstek et al. ....... 379/265.05 |
| 2004/0103409 | A1 | 5/2004 | Hayner et al. |

OTHER PUBLICATIONS

U.S. Appl. No. 13/924,571, filed Jun. 23, 2013, Eidelman et al.

* cited by examiner

*Primary Examiner* — Joseph T Phan
(74) *Attorney, Agent, or Firm* — Pearl Cohen Zedek Latzer Baratz LLP

(57) ABSTRACT

Methods and systems are described for call recording, e.g. in a VoIP system. At least one endpoint may be configured to terminate a call. A recording system may be configured to record call content data from multiple endpointsA the controller may receive, from a call exchange, interaction metadata relating to calls starting and terminating at the endpoint; receive notifications relating to call content from the recording system; and match the interaction metadata to the notifications.

16 Claims, 10 Drawing Sheets

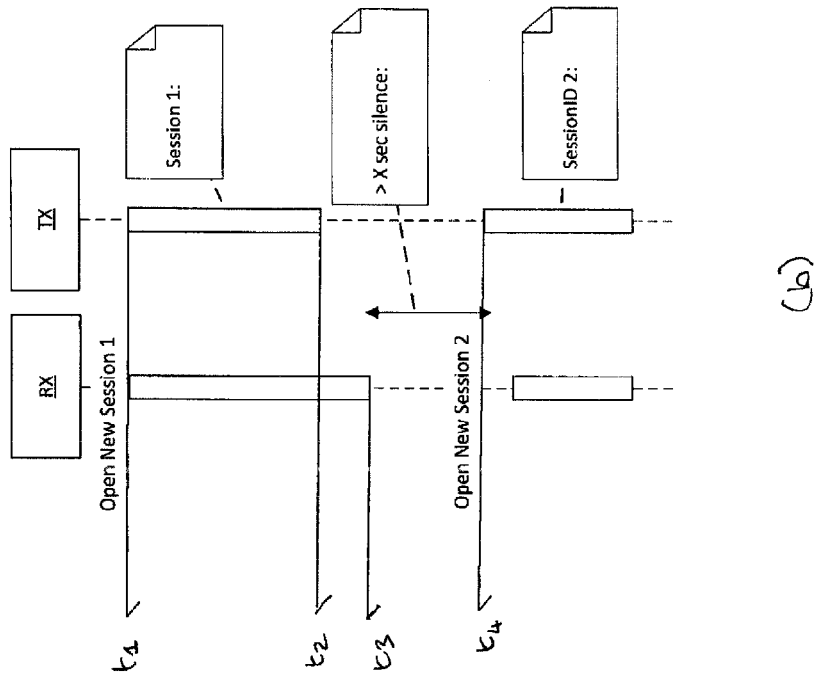
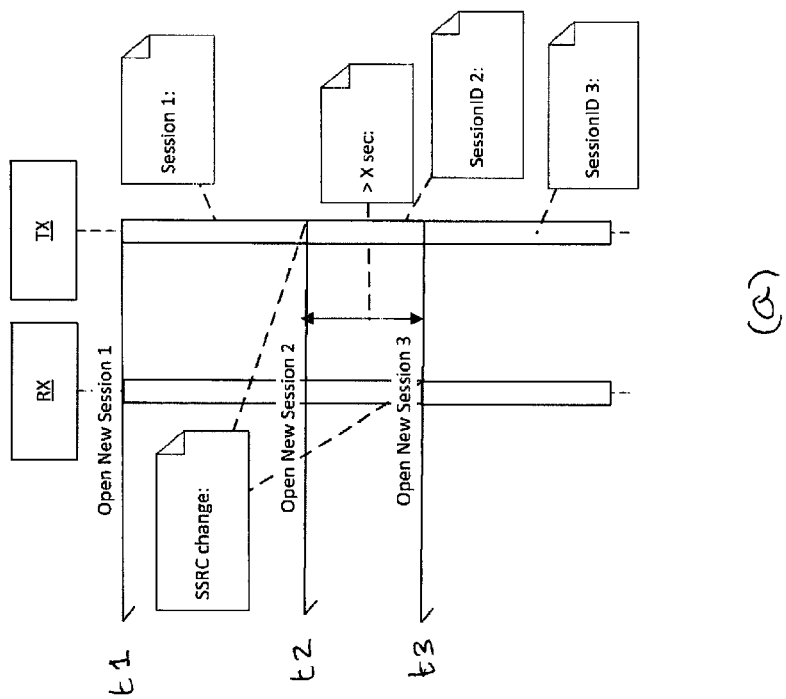
FIGURE 4

| bit offset | 0-1 | 2 | 3 | 4-7 | 8 | 9-15 | 16-31 |
|---|---|---|---|---|---|---|---|
| 0 | Version | P | X | CC | M | PT | Sequence Number |
| 32 | Timestamp ||||||||
| 64 | SSRC identifier ||||||||
| 96 | CSRC identifiers ||||||||
| 96+32×CC | Profile-specific extension header ID |||||| Extension header length |
| 128+32×CC | Extension header ||||||||

FIGURE 10

CALL RECORDING WITH INTERACTION METADATA CORRELATION

FIELD OF THE INVENTION

The present invention relates generally to the recording of information, such as audio, voice, video and data information, transmitted over a network. In particular, embodiments of the invention relate to Voice-over-Internet Protocol (VoIP) recording.

BACKGROUND

Current developments of the Voice over Internet Protocol (VoIP) technology leverage a broad array of contact center applications and flexible call-handling capabilities. In addition, contact channels have expanded from voice to include other applications such as, email, web, fax and the like. Computer telephony integration (CTI) allows integration and coordination of many customer contact channels, e.g., voice, email, web and fax, with computer systems.

It is typical for all CTI information to be provided by a central CTI server and certain CTI standards require knowledge of the entire call flow.

The following definitions are provided of certain terms that will be used below.

A "call" as used herein may be any communication, for example, between a customer and one or more agents, over a communication network. The routing of a call may be controlled by a call exchange such as such as a Private Branch Exchange "PBX" may also be referred to as an "interaction". A "call" may be for example a voice call, e.g. VoIP, but for the purpose of this description a call may also be a text or video call for example. It should be noted also that a "call" may be a one-way interaction where there is a one-way "conversation" or flow of RTP packets from a user endpoint to the recorder, or a "call" may be a two-way (bi-directional) or multi-path interaction between two or more parties where there is a multi-path "conversation" or flow of RTP packets from each of the multiple user endpoints to the recorder.

"Data" relating to a call as used herein may include "content data" and "metadata". The content data may include for example the data that is exchanged between parties to a call, such as but not limited to audio, video and text. "Metadata" may be for example information other than content data which relates to the call and/or content such as but not limited to start time, stop time, identities of parties, route of call, file name and filepath of location of content data, IP addresses and more as will be described by reference to specific examples.

SUMMARY

Embodiments of the invention provide a method of recording data relating to calls in a communication system, the communication system including at least one endpoint configured to create or/and terminate a call, a recording system configured to record call content data from multiple endpoints, and a controller, the method including at the controller for at least one of said multiple endpoints receiving, from a call exchange, interaction metadata relating to calls starting and terminating at the endpoint; receiving notifications relating to call content from the recording system; and matching the interaction metadata to the notifications.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the drawings:

FIGS. 4A) and 4B are timing diagrams showing two embodiments of file creation that may be used in the recorder according to embodiments of the invention;

FIG. 10 is a table showing the arrangement of an RTP packet header according to an embodiment of the invention.

DETAILED DESCRIPTION

Figure 1:
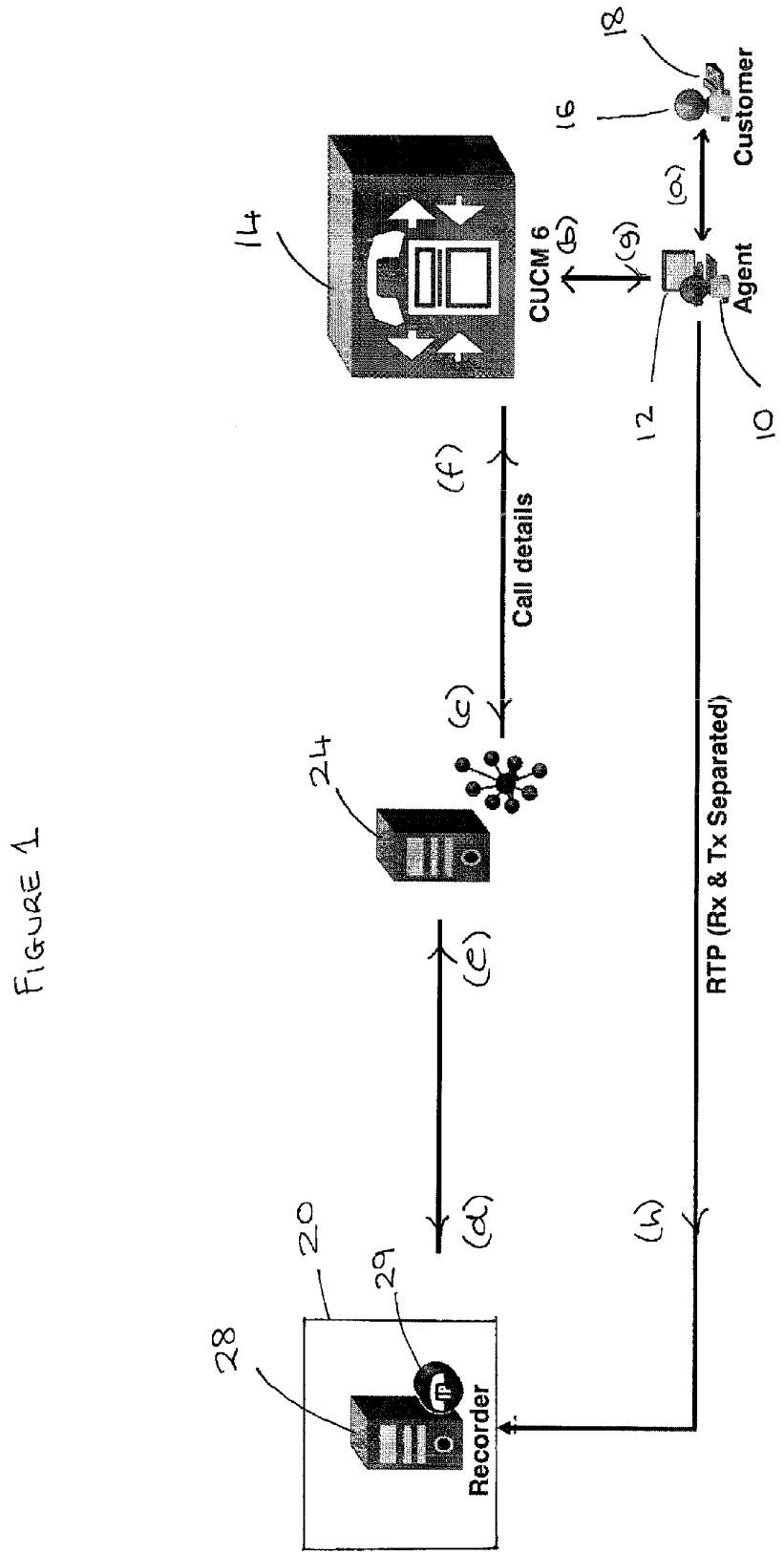
FIG. 1 is a block diagram illustrating the flow of information in a call recording system according to an embodiment of the invention.

The description that follows provides various details of exemplary embodiments. However, this description is not intended to limit the scope of the claims but instead to explain various principles of the invention and the manner of practicing it.

Aspects of the invention are applicable to a communication system include at least one endpoint configured to initiate or terminate a call (or both), and a recording system configured to record call content data from multiple endpoints. Recording of content data may be initiated automatically at the recording system upon receipt of content data from the endpoint. This is particularly useful when the recording system is configured for total recording of content data sent to and from the endpoint. The recording system need not wait for a signal from a controller to initiate recording. Instead the receipt of call content, e.g. a data packet with call content, triggers the recording of call content by the recording system.

Content data relating to different calls to and from the endpoint may be separately recorded. One way of achieving this is through use of a file structure. However other methods of separating content data will be familiar to those skilled in the art. Content data relating to a call may be divided into "sessions". There may be more than one session relating to a call. For example, multiple sessions relating to a call may be separated by periods of silence. Thus the recording system may initiate a new session automatically upon a change of identification data, such as a synchronization source "SSRC" identifier in the received call content data. Additionally or alternatively a new session may be initiated when content data is received after a predetermined period of not receiving call content data (a silent period of minimum length), e.g. by receiving no data packets or packets with no content. The recording system may hold a separate file relating to each session.

A call may have separate transmit and receive streams. According to some embodiments of the invention, separate sessions may be recorded for the respective streams.

As noted above, some embodiments may record content data relating to different calls in a file structure. Metadata relating to calls for which content is recorded may also be stored at the recording system. The metadata may be stored in a database structure. At least some of the metadata may be supplied to the recording system from a controller which in turn may have received it from a separate, possibly third party source or device over a network e.g. from a call exchange such as a private branch exchange "PBX" which controls the establishment of calls between endpoints. This metadata may be in the form of CTI messages.

On the controller side, the controller may receive, e.g. from a call exchange, metadata relating to calls establishing and terminating at the endpoint and notifications relating to call content from the recording system. The arrival of such data from two different sources may not be synchronized. The controller may then match the metadata to the notifications. The notifications may be sent by the recording system at the commencement and end of recording for a particular call. Since the metadata and the notifications may be received from different sources, and since the recording may be executed autonomously without reliance on the metadata, the content of the metadata and the notifications may not be helpful in matching the metadata to the notifications. Therefore, according to one embodiment, the controller may match the metadata to the notifications based on one or both of the absolute time of receipt of the notifications and/or metadata and time intervals therebetween.

The calls may be to or from the endpoint and may be one way, bidirectional or multi-path.

In the following discussion only one endpoint is discussed but it will be appreciated that both the controller and the recorder may in practice perform the same functions for multiple endpoints. It should also be noted that one controller may be associated with multiple recording systems.

The matching of interaction metadata to notifications may be initiated at a predetermined point in the flow of information to the controller, or in response to a predetermined notification.

The interaction metadata received from the call exchange may include call start and/or end notifications and the matching of interaction metadata to notifications may be initiated by the controller in response to receipt of a call start and/or end notification. In the preferred embodiment to be described below the matching is done in response to receipt of an end notification.

It should be noted that the notifications sent to the controller from the recording system may also include metadata. They may include notifications on start and end of recording call content.

Both the PBX and the recording system may communicate with the recorder using Computer Telephony Integration (CTI) messages.

The controller preferably sends to the recording system metadata relating to call content data recorded at the recording system whereby metadata at the controller is congruous with metadata at the recording system. For example the controller may send to the recorder metadata that matches or corresponds to metadata held at the controller. This assists in the handling of requests for data sent from the controller to the recorder or vice versa.

The content of a call may be divided, for example by a period of silence or a change in identification data, e.g. RTP packet identification data. Therefore there may be more than one recording session associated with a call. On the controller side a recording may be created for each call and preferably for each session. The recording may comprise interaction and recording metadata relating to each session, and no content. The interaction metadata may be reported to the controller by the call exchange without any content data, the content data being routed directly to the recording system by the endpoint. Thus the content data is not routed to the controller at all.

Thus the creation of the recordings may be controlled by the controller and the creation of sessions may be controlled autonomously by the recorder at the recording system.

Each recording may comprises additional metadata related to each session which is not stored at the recording system.

Methods and systems according to embodiments of the invention are particularly suited to so-called "total recording" in which all communications to and from an end point are recorded. Therefore the method may comprise configuring the recording system for recording of all content data exchanged in calls initiated at and/or terminating at the endpoint, i.e. content data sent to the endpoint and content data sent from the endpoint. This may require configuration of the endpoint under the control of the controller to copy all packets sent and received at the endpoint to the recording system.

Embodiments of the invention may provide a call recording system comprising a recording system configured to record call content data relating to calls to and from multiple endpoints, and a controller configured to record metadata relating to the calls, wherein the recording system is configured for total recording of content data sent to and from the endpoint, and initiating recording automatically on receipt of content data from the endpoint.

The controller of a system according to embodiments of the invention may be configured to receive from a call exchange at least some of the metadata relating to calls to and from the endpoint, receive notifications relating to call content from the recording system, and match the metadata to the notifications.

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

It is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

Operating Environment

Reference is made to FIG. 1, which illustrates the general flow of information in a call recording system such as might be used to operate a call center. Only one call center agent is shown for the purpose of this illustration, although any number of call center agents may be used. The system comprises user communication network endpoints 12 and 18, private branch exchange "PBX" 14, recording system 20, and controller 24. The recording system 20 comprises various components including recorder 28 and storage or memory e.g. in the form of a database 29. The recording system includes memory, not separately shown, in addition to the database 29. This memory comprises a file structure for recording call content, e.g. audio information in the case of audio calls. In practice a system of the kind shown in FIG. 1 will be implemented in a communications network which may include enterprise infrastructure such as a wireless network as well as public infrastructure such as the internet. The components of the system shown in FIG. 1 may communicate with each other via enterprise and/or public communications network infrastructure. Alternatively some of them may be combined, such as the controller 24 and the PBX 14.

Controller 24 may include one or more computer controllers or processors. Controller 24 and other units herein may be configured to carry out all or part of the methods disclosed herein by for example including circuitry configured to perform certain operations and/or by being connected to a non-transitory memory or storage device including instructions which when executed carry out methods according to embodiments of the invention.

Recording system 20 may include one or more computer controllers or processors, for example comprised in recorder 28. The computer controllers or processors may be configured to perform certain operations.

In general the controller has various roles including the provision of initial data such as IP address, and device identifiers (IDs) to initiate recording, e.g. at start up time; notification e.g. to different applications, relating to ongoing interactions and recordings to allow monitoring and tagging of interactions; and the halting of recording on demand, e.g. for compliance purposes.

Communication network end point 12 is operated by call center agent 10. End point 12 will usually be in the form of an Internet Protocol (IP) telephone ("phone"), but could also be a computer, e.g. desktop or laptop, or tablet computing device with voice communications capability. Whether or not it is in the form of a telephone, an endpoint with voice communications capability can be referred to as a telephony end point. It should be noted however that the methods to be described below are applicable to all kinds of communication sessions and are not limited to voice communications. As noted above other kinds of communication include video, instant messaging, e-mail, facsimile ("fax") and the Internet or web. The invention is not limited to these examples.

In the illustration of FIG. 1 the end point 12 is an IP phone. IP phone or other end point 12 may include a built in bridge to enable forking of information flows, such as may be required for conferencing or, as will be described below, recording calls to and from the IP phone. The operation of IP phone 12 is controlled by controller 24, e.g. via the PBX 14. Communication network endpoint 12 is shown in FIG. 1 communicating with communication network end point 18 operated by customer 16. Endpoint 18 may be controlled by a different controller. However in some possible implementations of the method and system to be described, endpoint 18 may be controlled and content data from it recorded in the same manner using the same system components as endpoint 12. Thus in a communications system using the invention there may be agent endpoints and customer endpoints used by customer users and agent users.

Other network endpoints not illustrated in FIG. 1 include smart media gateways, Interactive Voice Response (IVR) servers, Session Border Controllers (SBCs), and other endpoint devices of a communication network. The recording method to be described below with particular reference to a telephony endpoint is also applicable to other network end points in the communications system which route content and associated metadata to be recorded, e.g. in a file structure.

Communication network end point 18 may be in the form of an Internet Protocol (IP) phone, a computer, e.g. desktop or laptop, or tablet computing device preferably with voice communications capability. End point 18 need not be IP enabled and could be a conventional packet switched telephone network "PSTN" phone.

In order for a call to or from agent end point 12 to be recorded, the recording system 20 is joined as a party to the call using the bridge in end point 12. The bridge is configured by the controller 24 via the PBX 14. Each physical phone, e.g. end point 12 can have multiple lines which can be recorded independently in end point 12. Each line can be configured under the control of controller 24 sending control signals via the PBX 14 for:

Total Recording (also called "automatic recording") in which all communications to and from the end point 12 are recorded Interaction based Recording ("Application Invocation", upon application programming interface "API" request) in which recording is performed on a selection of sessions or interactions No recording ("Disabled").

In a typical set-up there will be separate voice streams, receive Rx and transmit Tx, between agent end point 12 and customer endpoint 18. Communications to and from an agent end point 12 can be recorded and monitored at the same time. The monitoring and recording is done under the control of controller 24 via PBX 14 which instructs the agent end point 12 to send data to recording system 20. Two streams, one for transmit and one for receive, are then established between the agent end point 12 and the recording system 20. In an alternative embodiment one stream is established for both transmitted and received data.

It should be noted that the agent and/or customer can be notified that they are being recorded by an audible tone. Usually recording has no effect on the agent's or customer's visual display if provided although a visual indication of recording is possible.

The methods to be described below are intended for a total or automatic recording although they may have other applications. It will be appreciated from the foregoing that total recording could be operated under the control of the controller 24. Thus a possible flow for total recording is as follows:

Call is established between agent customer end points 12 and 18 (flow (a) in FIG. 1)

Agent end point reports the call establishment to controller 24 via PBX 14 (b), (c)

The controller 24 invites the recorder to become a party to both calls Rx and Tx (d)

The recorder 28 accepts the calls and replies with an IP address and a port for each call (e)

The controller 24 automatically sends two call set up messages to the agent end point 12 via PBX 14 to instruct the built in bridge of end point 12 (f), (g)

Agent end point 12 establishes two calls with a recorder within recording system 20 whereby two streams of data (Rx and Tx or agent and customer) are sent to the recorder (h).

It should be noted that it is not always the case that separate transmit and receive streams are created and the methods described below are applicable to separate, also known as stereo, streams as well as combined transmit and receive streams, also known as summed streams.

The controller, also known as an interactions center 24, may include a database storing interaction metadata.

Because the IP address has been provided by the recorder 28 to the controller 24 prior to recorder 28 joining the call, it is possible to correlate metadata relating to the call which is reported to the controller with the information stored at the recording system 20.

It will be appreciated that each "call" in the flow described above involves the exchange of messages between the elements for establishment. For VoIP calls, audio data from the agent end point 12 is conveyed in real time protocol (RTP) packets. The following description will describe flows using RTP packets by way of example but as noted above the method to be described is not limited to the recording of audio information. The RTP packets contain the call content such as the audio data.

In the flow just described, all recording is done under the operation of the controller 24. This means that there may be interruptions in recording if there is any failure of controller 24, or network failure between controller 24 and recorder 28, or between controller 24 and PBX 14. Typically the recording system and the controller are in different locations. A network failure could be particularly problematic if public infrastructure is required to route messages between the controller and the recording system since the restoration of operation may be beyond the control of the operator of the controller and recorder of FIG. 1.

It would be advantageous to provide a system in which recording was possible independently of the controller 24 so that, for example, recording would be possible even if the controller 24 was off line for any reason. In the following there is described a method in which the recording system 20 behaves independently of controller requests. This presents an additional problem in that information recorded at recording system 20 needs to be correlated with interaction metadata provided to the controller 24.

A solution to the problem of metadata correlation is also proposed below.

Figure 2:
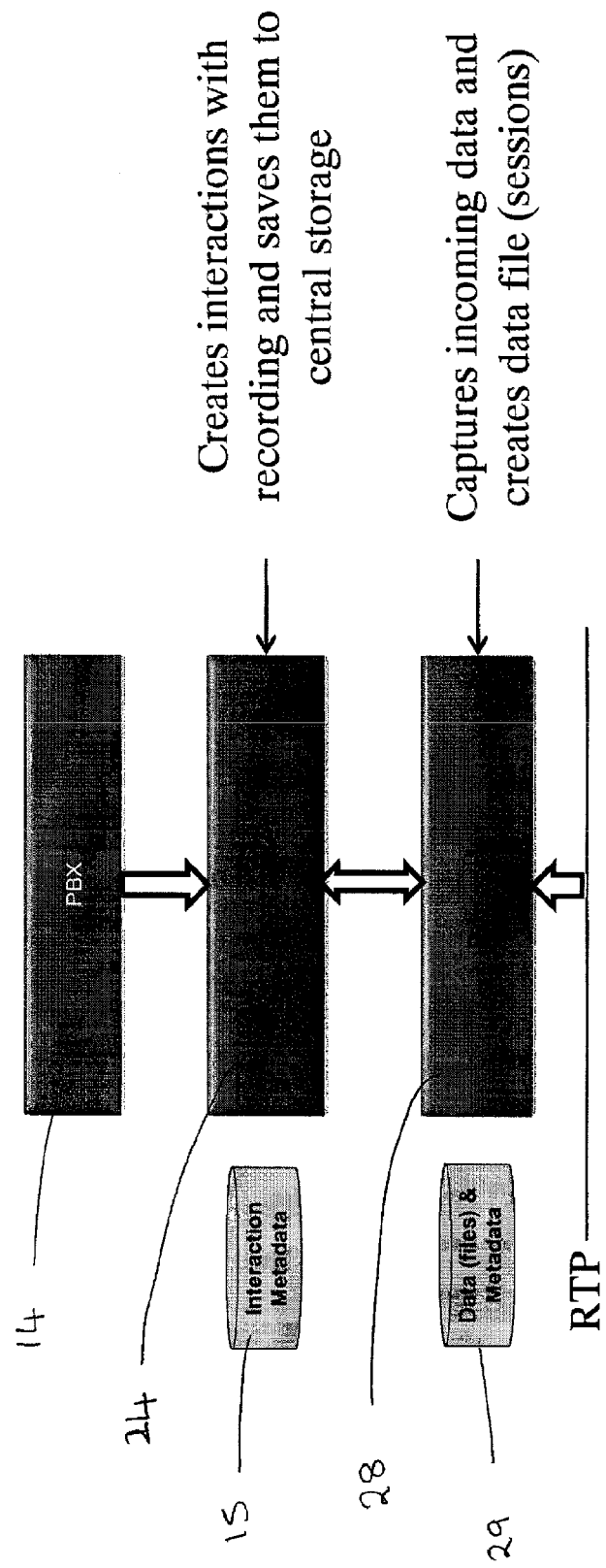
FIG. 2 is a block diagram explaining the relationship between the controller and the recorder of FIG. 1 according to an embodiment of the invention.

The respective roles of the controller and the recording system are illustrated in FIG. 2. Here it is shown that a recording system 20 comprises a recorder 28 and associated storage 29. The recorder 28 receives RTP packets and creates a data file for each session between an agent 10 and a customer 18 which is stored along with interaction metadata. The interaction metadata may be stored in a database at the recording system 20 that is linked to the file structure.

As is known in the art, the controller 24 typically receives information relating to a call from the PBX 14. The controller 24 has an associated database 15. This database 15 stores only interaction metadata. Database 15 does not store content of the RTP packets, e.g. audio information. This content is stored in the recording system 20. More specifically, database 15 stores only full interaction metadata, i.e. without the content of RTP packets, for future application usage (evaluation, different queries etc.). Database 29 is used also for storing part of the metadata allowing playback, archiving (moving the data file to final storage) and other usage when the central database 15 is not accessible.

One of the purposes of storing interaction metadata in database 15 is to facilitate the searching of content data stored in files at the recording system 20.

The term "session" in the following is used to describe a data file created by a recorder based on data (e.g. RPT packets) received by the recorder. Thus the recorder stores a session, or data file, relating to each call. It is possible for more than one session to be associated with a call as will be explained in the following, in which case each session comprises a subset of the content data sent to or from an endpoint during a call. It is possible to create separate sessions, one for the transmit stream and one for the receive stream, for example.

The term "recording" as a single noun is used in the following to denote a collection of metadata relating to a session such as might be stored in a controller operational database as described further below. As the following explanation will show, it is possible for there to be more than one session corresponding to a single call or interaction. In the embodiments of the invention described below, one recording is created for each session. Each recording (and session) will be associated with an interaction.

Where "recording" is used as a verb it usually refers to the accumulation of content data from a call such as audio information in the traditional sense of recording, albeit that this will be in digital, usually packetized, form.

More generally, a session is an object, e.g. file, on the recording system side, and a recording is a corresponding object on the controller side. A recording has a reference to the corresponding session plus additional metadata (e.g. status etc.).

Figure 3:
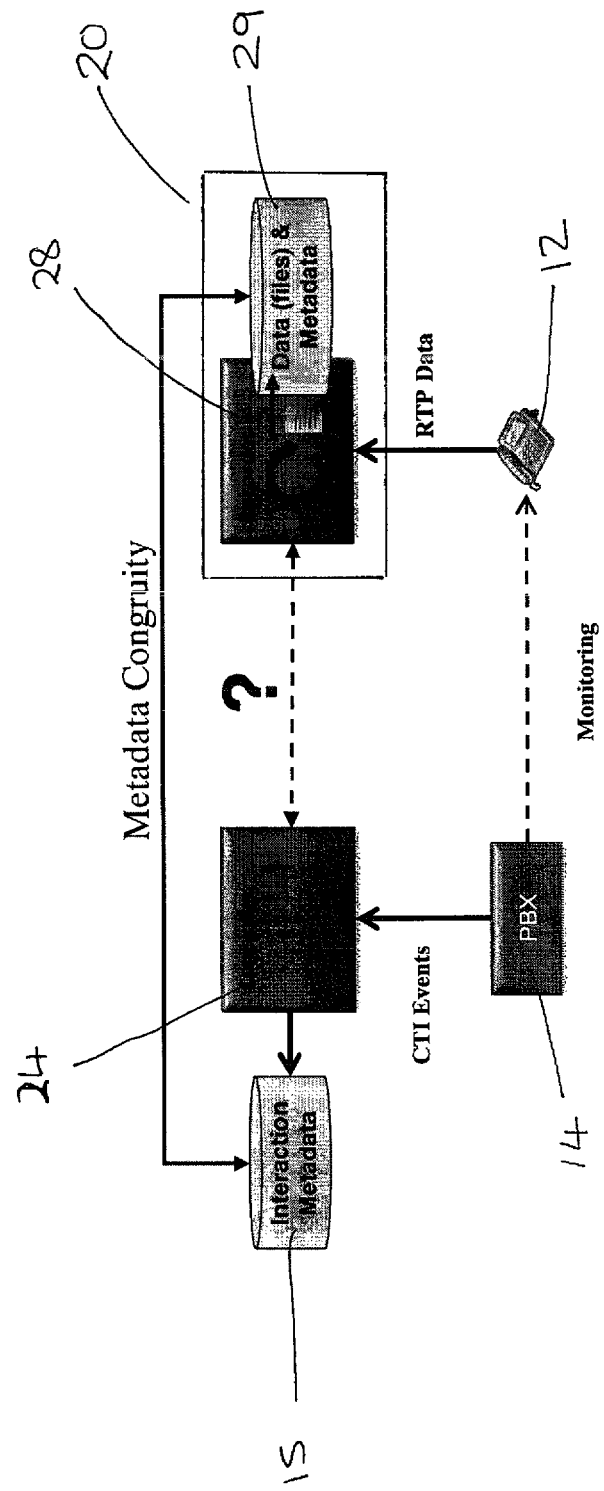
FIG. 3 is a block diagram illustrating the problem of ensuring metadata congruity according to an embodiment of the invention.

FIG. 3 illustrates the problem of metadata correlation mentioned above. In FIG. 3 items previously described are indicated with the same reference numerals. As shown in FIG. 3 the PBX 14 monitors the status of a call involving the agent endpoint 12 and reports the status and other information to the controller 24, for example using computer telephony integration (CTI) protocol. The recorder 28 records RTP packets and saves them e.g. on local disc as a session (file) and updates, in parallel, relevant call metadata in database 29. The controller 24 saves complete call metadata received from PBX in operational database 15.

However additional measures are required to match metadata in the respective databases 15 and 29 when the recording has taken place independently of the controller 24. In this situation the recording system 20 needs to create one or more files (sessions) for each interaction (call) based on incoming data (RTP packets). A problem which the methods describe below address is how to ensure metadata congruity between the operational database 15 of controller 24 and the database 29 at recorder 28. In this connection it should be borne in mind that the controller 24 needs to know about the data files (sessions). This may be required for example because the data file path is part of reported metadata to operational database 15. On the other hand the recorder 28 needs to know about the interactions (so that interaction metadata on the recorder can be used for fetching/playback/archiving etc.). In other words the controller does not need the content of the sessions but it needs to know how to identify them, and conversely the recorder needs to know what interaction data is available at the controller, therefore the respective sets of metadata at the controller and the recorder must be correlated.

In one possible implementation of this system the session ID, but not file path may be reported to the controller. The Session ID may be kept in the recorder database 29 with the actual file path. Once a playback/archiving request arrives at the recorder it performs resolution of the files path according to session ID. The method of recording to be described below allows changing of actual file path, for example during an archiving process or moving to another location, without the need to update the operational database 15 at the controller 24.

Although the following description will focus on a single agent endpoint it will be appreciated that the PBX 30 and controller 14 will in practice control multiple endpoints and the recorder will receive information from those multiple endpoints.

In the following, methods of operation of the recorder independently of the controller will firstly be described, followed by a description of how congruity between metadata is ensured. Both are firstly described at a general level followed by a more detailed description.

Overview of Recorder Operation

It should firstly be noted that a communication channel is preferably established between the recorder and the IP endpoints for which the recorder is monitoring calls, whereby the recorder can listen to all calls.

Since the recorder is operating independently of the controller, the controller is merely listening for notifications in order to perform an update operation at the end of an interaction and may not be controlling a call set up, for example.

FIG. 4 shows two timing diagrams each showing a method of file creation that may be used in the recording system 20. Both methods may be implemented in the system 20 and therefore the appropriate one may be chosen according to the conditions of the RTP streams. Thus in a preferred recording system and method, the recorder always opens or closes sessions according to the algorithm described below and updates the controller if it is available.

Each of FIGS. 4A and 4B) show two RTP streams, receive RX and transmit TX. The time proceeds in the vertical downward direction.

As is known in the art, each RTP packet has inserted into its header a list of synchronization source "SSRC" identifiers of the sources that contributed to the generation of that packet. In the method shown in FIG. 4A, the recorder creates files based on SSRC changes. In other words a new data file is created if the SSRC is changed in one of the RTP streams. This method may operate according to the following rules:

i. In case of stereo recording→both (RX and TX) streams are written to the same data file (although as noted above they can be written to separate files if required)

ii. If an SSRC is changed, the current session is closed and a new one is opened iii. If an SSRC is changed also in the second stream within X seconds of a change in the first stream (X configurable with default e.g. 4 seconds), a new session will not be created. This is done to deal with race conditions when the SSRC cannot be changed simultaneously in both streams iv. If the other SSRC is changed after a delay of more than e.g. 4 seconds this will be considered as a new session in which case one session file is closed and a new one is opened.

As shown in FIG. 4A, at time t1 a new session, labelled session 1, is opened. A first SSRC change is noted at time t2 in the transmit stream TX. This results in a new session, session 2, being opened and session 1 being closed. A second SSRC change is noted in the receive stream RX at time t3. Since t3-t2 is greater than the predetermined delay of X seconds, session 2 is closed and session 3 is opened.

It should be noted that in the case of summed recording, e.g. when there is only one stream per session from end point 12 to recording system 20, every change in SSRC will result in one session being closed and a new session being opened.

FIG. 4B shows an alternative method for closing files upon silence. In the case of stereo recording a session file is closed in the event of silence in both streams at the same time for a period of more than X (configurable e.g. 4) seconds. In this context "silence" means the absence of an RTP packet in a stream, or RTPs having null values. In this scenario a possible value for X is 4 seconds. Thus as shown in FIG. 4B session 1 is opened at time t1, the transmit stream goes silent at time t2, the receive stream goes silent at time t3, following which both streams are silent for more than X seconds ending at time t4. A new session 2 is opened at t4 when the silence is interrupted in the transmit stream. Session 1 is closed at time t4 with the end time noted as t3 which is the start of the silence in the receive stream.

It will be seen from the foregoing that the recorder operates according to a deterministic algorithm for creating files based on data only SSRC or silence without the controller intervening. It should be noted that the session files (data files) can be closed in other circumstances than those given above such as when failures occur.

Overview of Controller Operation

In the methods described below it is proposed that only the controller, of all the components of the recording system, is responsible for deciding on data, e.g. audio content, and metadata correlation. Thus one component, in this example the controller, updates all, i.e. the controller triggers updating of the metadata on the recorder 29 and the updating of the interactions database 15.

The controller 24 performs correlation of metadata at the end of an interaction (or during an interaction) once it is able to decide if a recording relating to a session (hereinafter a recording session), or possibly a recording session that is still open, belongs to a current interaction. In this case it simply updates the recorder 28 by sending it a notification and recorder 28, in its turn, updates the local database 29 to update the recording. Thus:

1. The controller 24 monitors open sessions on the recorder 28
2. The controller 24 correlates an interaction with a recording (or several recordings).
   a. On End Interaction the controller decides which recording belongs to which interaction
   b. One short (<1 sec—configurable) recording at the beginning of an interaction and one short recording at the end of an interaction will be filtered out as the corresponding sessions most likely belong to the previous or next interaction
   c. Since Metadata and (content) data are reported directly or indirectly from different sources (e.g. PBX to the controller and RTP stream from telephone to recorder respectively), there can be a race condition between the report and times to the controller, so short sessions can be created as result of this race condition. The controller decides whether a specific session should or should not be reported to either the database 15 or 29 after it has the full picture of specific interaction and recordings based on the above algorithm.
3. The recordings with relevant metadata will be reported to the operational database 15 and to the recorder database 29.

Figure 5:
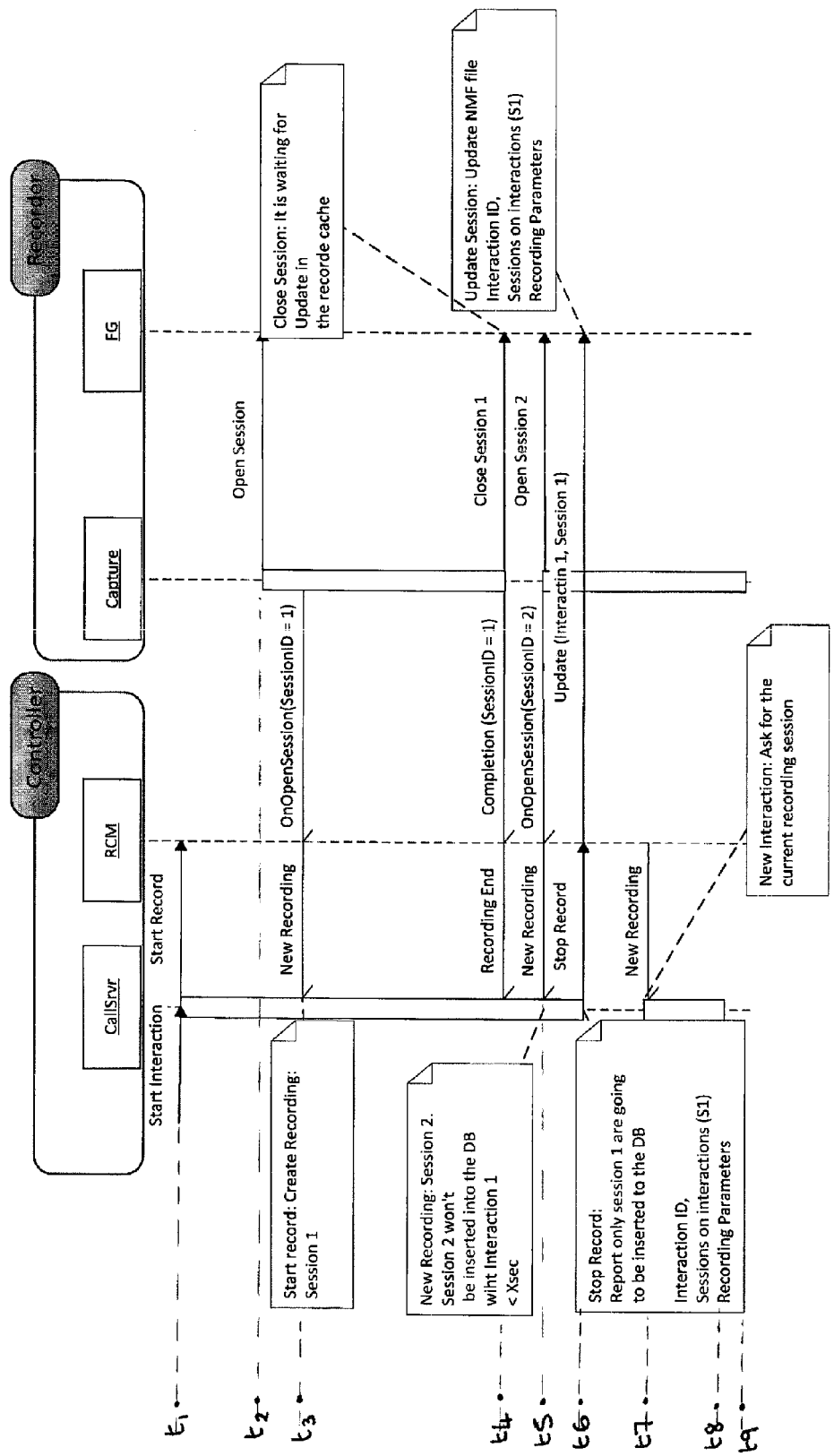
FIG. 5 is a timing diagram showing an embodiment of a method of operation by the controller to match interactions and data files according to an embodiment of the invention.

The operation of the controller and the recorder is illustrated by the timing diagram of FIG. 5. In FIG. 5 the controller is shown as comprising call server, CallSrvr, and resource coordination manager RCM. The recorder is shown as comprising a capture module and file generator FG.

In FIG. 5 at time t1 the caller receives a notification that a call has commenced from the PBX 14. This is noted as the start time of an interaction and an interaction (with relevant metadata) is created on the controller 24, referred to as Interaction 1.

A time t2 the first RTP packet is received by the recorder. At this time the recorder 28 opens a new session (content file)

with ID1. As noted above, this is done autonomously by the recorder 28 without any instruction from the controller 24.

At time t3 the controller 24 receives an event notification from the recorder 28 that the recorder has received an RTP packet (i.e. a non-null RTP packet) and a new recording (collection of metadata) is created at the controller 24. The recorder 28 notifies the controller 24 that the corresponding session file has ID1. It should be noted here that if the controller fails or is offline, the delay between t2 and t3 will be greater than normal but recording by the recorder will not be affected and may for example be completed by an offline process.

At time t4 the recorder either ceases to receive RTP packets or ceases to receive RTP packets with content. The recorder closes the session according to the procedure described above with reference to FIG. 4 and sends an event notification to the controller to notify the controller that the session ID1 is complete. At the recorder, the first session is closed. The controller at this point will update the recording stop time and keep the recording in memory. However the controller will not close the recording until it receives the appropriate metadata from the PBX, i.e. confirmation that the call to which the recording relates has ended (at t6, see below).

At time t5 the flow of content-containing RTP packets to the recorder recommences. The recorder opens session 2 according to the procedure of FIG. 4 and notifies the controller The controller opens a new recording corresponding to session 2. The controller attaches this recording to the current open interaction (ID1).

At time t6 the controller receives confirmation from the PBX that the first call has ended. At this point the controller has two recordings and the recorder has a closed session (Session 1) and an open session (Session 2) attached to the interaction ID1. The controller checks all recordings attached to the interaction being closed and deduces that only one session (the first one S1) is related to the interaction (the second session is filtered out since its duration <1 second). The controller updates the interaction database 29 at the recording system 20 (through the recorder 28) so that interaction I1 is related to S1. More generally at this point the controller matches metadata to sessions based on one or both of the absolute time of receipt of the notifications and/or metadata and time intervals between them.

At time t7 the controller receives a notification of a new interaction commencing before receiving a stop notification corresponding to the second session. A new recording commences at the controller and is attached to interaction ID2. Therefore the controller has one open recording (S2) and a similar process to that described above continues at the end of each interaction.

At time t8 the controller receives a notification from the PBX that the second call has ended.

At time t9 the recorder either ceases to receive RTP packets or ceases to receive RTP packets with content. The recorder closes the session according to the procedure described above with reference to FIG. 4 and sends an event notification (not shown in FIG. 5) to the controller to notify the controller that the session ID1 is complete.

In the foregoing and the following there are several mentions of configurable time limits, e.g. 1 second. This time period can be varied (configured) according to the implementation of the method or system. The actual time periods chosen may depend on customer site conditions for example.

It should be noted in the foregoing that the recorder sends notifications, also known as update messages to the controller without being requested to do so by the controller. The recorder has its own internal management mechanism for the sending of such updates such as silence and SSRC events, which the controller can match with information it holds.

Detail of Recorder Operation

Figure 6:
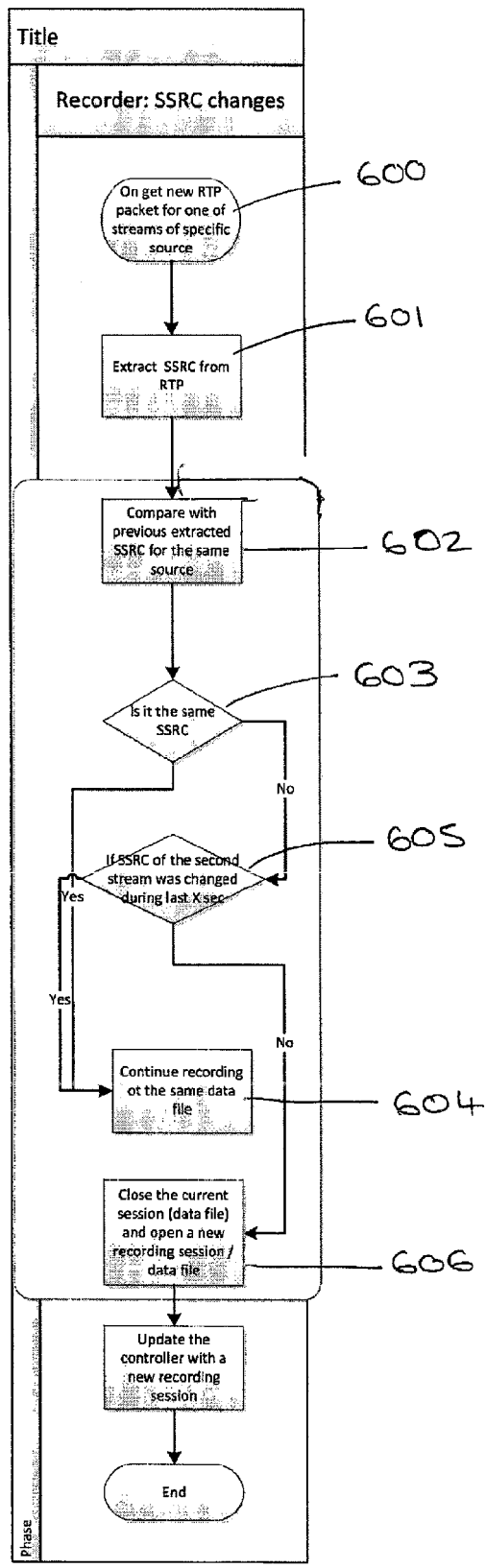
FIG. 6 is a flow chart showing the operation of the recorder to open a new session based on SSRC changes according to an embodiment of the invention.

FIG. 6 is a flow chart showing a possible mode of operation of the recorder 28 according to one embodiment. The recorder 28 sniffs the network according to an IP address and/or port or device identity that the controller 14 provided to the recorder in a Start Record Request once on Startup. Alternatively the IP address and/or identity of port or device may be provided to the recorder in a configuration file. Thus after start up or configuration there is no dependency on the availability of controller 14 during the recording process. In a practical situation the recorder 28 will receive multiple IP address/port or device combinations for which data is to be recorded, e.g. for different endpoints. In the following the operation of the recorder will be described referring to the IP address of a device but it will be appreciated that the address could also be allocated to one port in a larger device. Therefore references to IP address/device could be replaced with IP address/port. A communications channel and associated data stream will be established between the controller 24 and the recorder 28 on Start Up, separately from any streams established e.g. between the recording system 20 and endpoints whose data is to be recorded.

At operation 600 in FIG. 6, the recorder 28 receives RTP packets from end points or nodes in the communications network of which the components of FIG. 1 form a part and creates data files (sessions) based on the content of the RTP packets. The files are structured such that one or more files are allocated to each IP address/port or device.

The process of FIG. 6 then may continue as follows:

Extract SSRC from arrived RTP packet header from the specific source (IP/Device) (operation 601).

Find the current stream for the same source and compare the SSRC in the current stream with the SSRC of newly captured packet (operation 602).

Stream.SSRC==RTP header.SSRC? (decision 603)

If both SSRCs are the same, the recorder continues processing of captured data to the same stream, i.e. a file allocated to that stream (operation 604).

If both SSRCs are not the same, a check is made to confirm that the packet is not in the same stream that caused the opening of the session (not shown in FIG. 6) and a check is made as to whether the SSRC on the second stream was changed during the last X seconds (decision 605).

If—Stream.SSRCChangedTime<Xsec (decision 605—yes) processing continues to capture data to the same stream. As noted above since the SSRC on both streams cannot be changed simultaneously, this threshold is used (X sec) to avoid very short data files.

If the SSRC on the second stream was not changed during the last X seconds (decision 605—no) now:

Stream.SSRCChangedTime>Xsec.

Again a check is made to ensure that the packet is not from the same stream that caused the opening of the session:

Session.OriginalStreamID=Stream.StreamID?

If no, the current session/data file is closed at operation 606:
Session.Close( ); StreamRx.Close( ); StreamTX.Close( )
A new session/data file is opened at operation 606:
session.Open( )
The controller is updated with new session:
Controller. OnOpenSessionEvent(new Session)
e.g. as shown in FIG. 5 at time t3 and t5.

For completeness an example of a standard RTP packet header format is shown in FIG. 10.

It should be noted at this point that the recorder only holds metadata relating to sessions and streams. This is not held at the controller.

The following tables show examples of a session structure and a stream structure that may be used in the recording system. Note that these are held at the recorder only and not at the controller. One session may correspond to two streams which is one reason for having separate session and stream structures. These structures include a minimum amount of metadata for identifying the sessions and streams and associating them with each other. More metadata is held at the controller or operational database as will be described below.

Session Structure

| SessionID | Long |
|---|---|
| Streams[ ] | |
| Source | string |
| OnOpenSessinEvent | event |
| Silence | bool |
| SessionTimer | Timer |
| OriginalStreamID | Long |
| LastPacketTime | DateTime |
| InteractionID | Long |
| StartTime | DateTime |
| StopTime | DateTime |

Stream Structure

| StreamID | Long |
|---|---|
| StreamDirection | Rx/Tx |
| MediaType | Voice/screen |
| SSRC | String |
| SSRCChangeTime | DateTime |
| LastPacketTime | DateTime |
| StartTime | DateTime |
| StopTime | DateTime |

It should be noted that these structures contain new fields to hold metadata received from the controller, for example InteractionID, AgentID, DeviceID FIG. 7A shows the operation of the recorder when a session ends with silence as described briefly above, for stereo recording (separate receive and transmit streams) according to one embodiment. At operation 701, an RTP packet is captured for one of the streams related to the source.

The stream last packet time is set at operation 702:
Stream.LastPacketTime=now
The session last packet time is set to be equal to the stream last packet time at operation 703:
Update Session Last Packet Time
Session.LastPacketTime=Stream.LastPacketTime
Regular processing continues as shown at operation 704. It will be appreciated that if there are multiple sessions corresponding to a stream operation 703 will be repeated for each open session.

Figure 7:
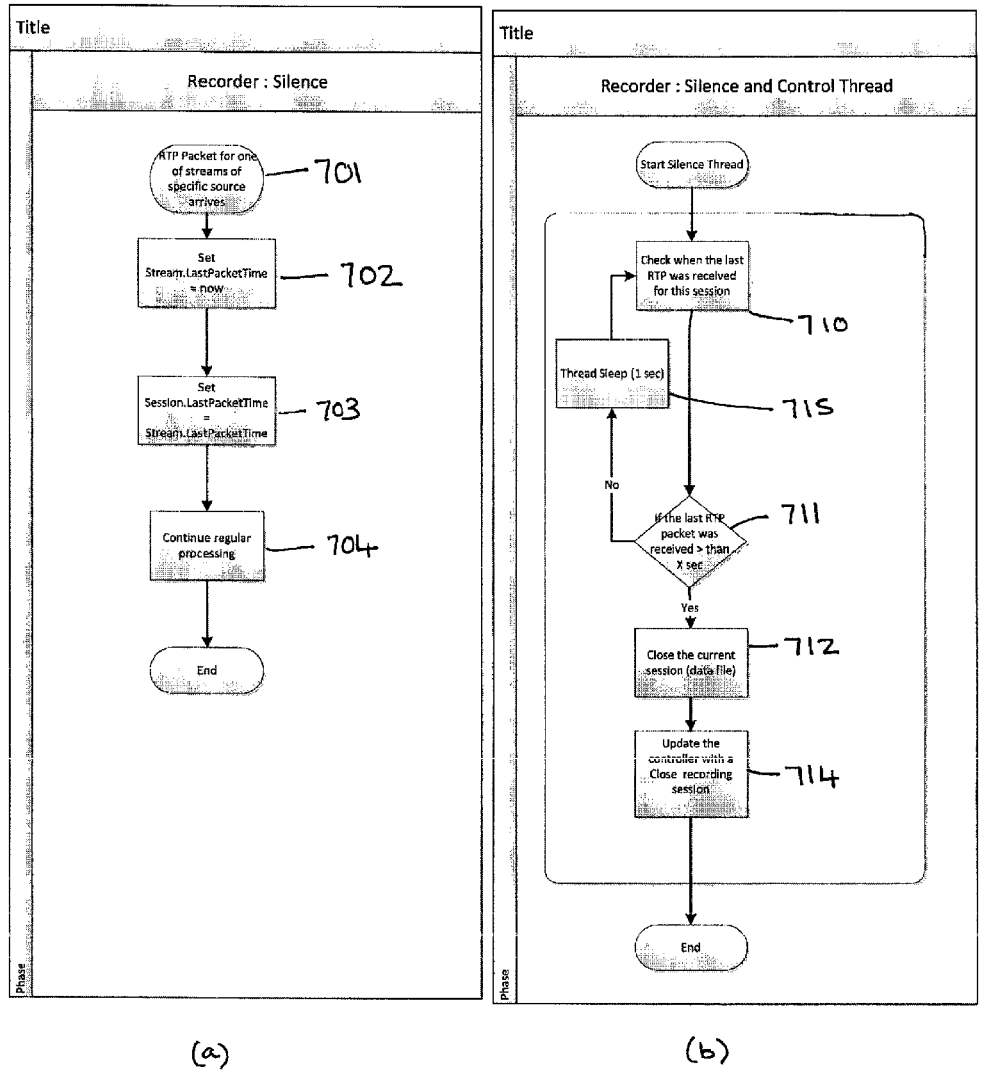
FIGS. 7A) and 7B) are flow charts showing the operation of the recorder to open a new session after a period of silence according to embodiments of the invention.

The process for summed recording is simpler and is not illustrated. The session last packet time is determined when no RTP packet is captured for a stream related to a source:

Summed recording (one stream)
a. No RTP packet is captured for the stream related to the source (Stream.RTP !=null)
b. Session.LastPacketTime=now and Stream.LastPacketTime=now FIG. 7B shows the use of a control thread which is preferably used to ensure there are no false stops due to e.g. lost packets according to one embodiment. Thus the process of FIG. 7 shows that a current session will be closed only after a period of silence longer than a predetermined amount. Thus in FIG. 7B a check is made at operation 710 to determine when the last packet was received for the current session, at decision 711 it is determined whether this was more than x seconds ago. If yes the current session is closed at operation 712 and the controller is updated at operation 714. If no, the system waits (sleep) for one second (configurable) at operation 715 and the process returns to operation 710. In FIG. 7B the flow for one session is shown. In practice more than one session may be open as noted above with reference to FIG. 5. Therefore the flow may be as follows:

Control Thread (Timer)
a. Sleep for 1 sec
b. Wake Up
c. Go over all sessions and check Session.LastPacketTime
d. If Now—Session.LastPacketTime close a session
  i. Session.Close( ); Stream.Close( );
e. Update the controller:
  ii. Controller.OnCloseSessionEvent(Session)

Flow Example:
A specific example of the flow shown in FIG. 4 is as follows:
1. The recorder is sniffing the network and gets RTP packets for two streams Stream1 and Stream2 that are related to the current CurrentSession.
2. FIG. 4 SSRC of Stream1 was changed: Stream1.SSRC != RTP.SSRC
  a. Close the current session/data file
    CurrentSession.Close( ); Stream1.Close( ); Stream2.Close( )
  b. Open a new session/data file
    NewSession.Open( )
  c. Update Controller with new recording session
    Controller.OnOpenSessionEvent(NewSession)
3. SSRC of the second stream was changed after more than X sec
  Now—Stream2.SSRCChangedTime>Xsec
  a. Close the current session/data file
    CurrentSession.Close( ); Stream1.Close( ); Stream2.Close( )
  b. Open a new session/data file
    NewSession.Open( )
  c. Update Controller with new session
    Controller. OnOpenSessionEvent(NewSession)

Detail of Controller Metadata and Data Correlation

Figure 8:
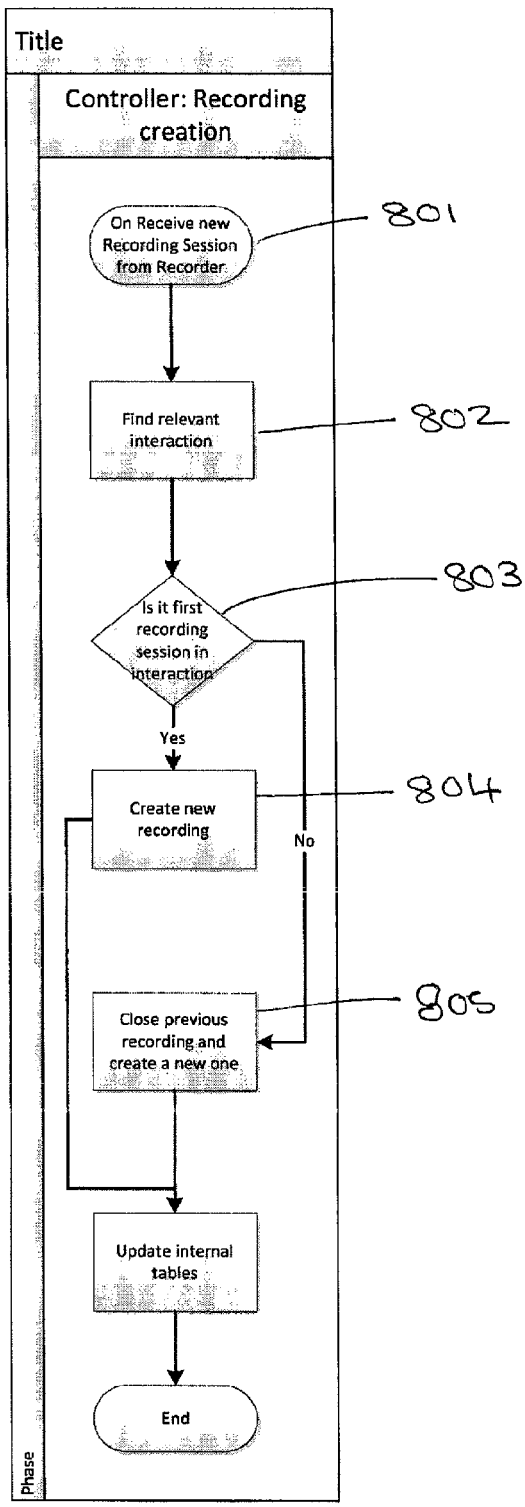
FIG. 8 is a flow chart showing the operation of the controller to create a new recording according to an embodiment of the invention.

The controller holds a data structure of all open calls and their sessions. Every call (interaction) has a start time and stop time. Every session (file) has a start time and stop time associated with it. A preferred method of operating the controller to create a recording is now described with reference to FIG. 8.

After the recorder 28 has opened a new session, it reports this to the controller 24. The session is created at the recording system 20 when an agent/customer start talking. A new session (file) is opened and this is reported to the controller at operation 801. At operation 802 the controller 14 finds the relevant interaction, the commencement of which should have been notified to it by the PBX. Usually the notification of the interaction, e.g. in the form of a CTI message, comes before the metadata relating to the session from the recording system 20. However if session metadata comes before a CTI or other message relating to the interaction from the PBX, the controller 24 keeps it until an interaction is reported, e.g. by the PBX, and starts processing according to recording device identity information: (Session.DeviceID or Session. IPAdress—attributes of the recorded source according to what was mapped in the system)→regular flow.

This processing will usually include the creation of a new recording (metadata collection) corresponding to the session.

Once the relevant interaction is found by or received by the controller 24, the controller adds the recording to this interaction, or associates the recording with the interaction, e.g. using the database 15. It is not necessary for the operational database 15 to be used at this point. For example, interactions may be kept in the controller internal memory and reported to the database 15 at a later stage. However, it is possible to use database 15 to hold open interactions.

A decision is next made at 803 whether this is the first recording (corresponding to a session) in the interaction. If it is the first recording (Interaction.Recordings==null), it creates a new recording at operation 804 and adds the recording to this interaction. If this interaction already has recordings for this source (e.g. domain name, "DN"), the last recording is closed and a new one is added at operation 805 (Interaction.Recordings+=Recording). Thus it is possible to have more than one session (and corresponding recording) per interaction, e.g. due to silence during recording, SSRC changing. On creation of a new recording, the controller marks the current recording as closed (Stop Time=SessionStopTime) and opens a new recording with new session ID.

The tables below show the data that is held at the controller for recordings and interactions.
Recording:

| Type | Name |
|---|---|
| Int | RecordingID |
| int64 | RecordingIndex |
| Int | participantId |
| int64 | StartTime |
| int64 | EndTime |
| Int | Logger |
| int64 | Logger_Time_Diff |
| Int | summationType |
| Short | exceptionTypeId |
| Int | recordedMedia |
| int64 | sessionID |
| String | IPAdress |
| String | DeviceID |

Interaction:

| Type | Name |
|---|---|
| Int64 | InteractionID |
| Int64 | CompoundID |
| Int | SwitchID |
| Int64 | StartTime |
| Int64 | EndTime |
| Int64 | Duration |
| Participants[ ] | Participants |
| Recordings[ ] | Recordings |

It will be noted that the interaction metadata stored at the controller is more comprehensive than that stored at the recording system and includes such items as participants that are not identified in the recording system database 29.

Figure 9:
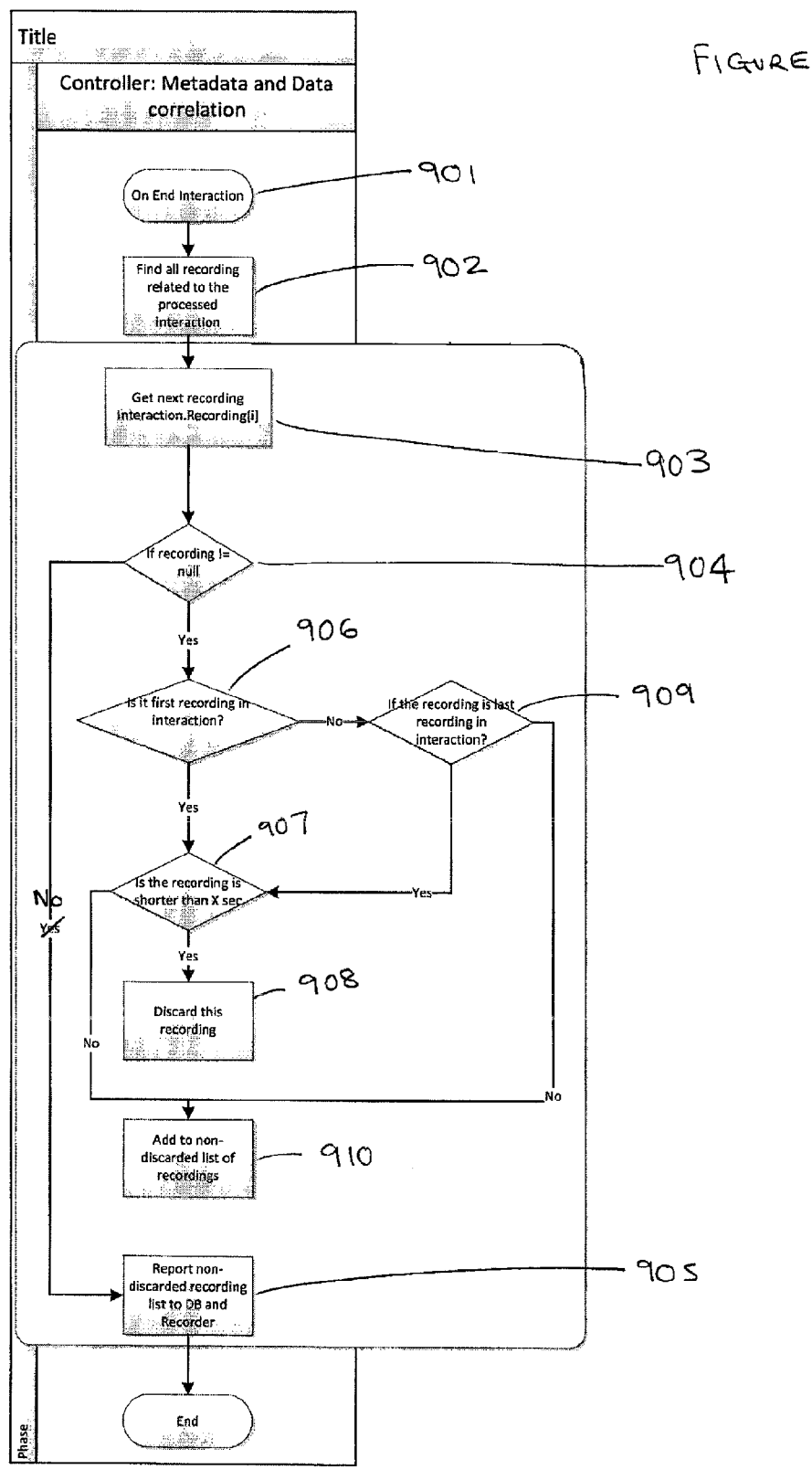
FIG. 9 is a flow chart showing the operation of the controller to correlate data and metadata according to an embodiment of the invention.

FIG. 9 is a flow chart showing the operation of the controller at the end of an interaction, for example as notified to the controller by the PBX. On notification of the end of an interaction at operation 901 a search is performed for all recordings that might relate to the interaction. One interaction might have more than one recording, see FIG. 5 for example where interaction 1 has two recordings at the end. There may be various scenarios where more than one recording is created for one interaction: examples include agent pressing "hold", agent stopping recording for compliance reasons etc.

During an interaction a list is compiled of all recordings that might be associated with it. At the point of operation 901 the controller may not have received a Completion (with SessionID) notification (see FIG. 5) from the recorder 28 in response to which a recording ends, so the recordings searched in operation 902 have not necessarily ended (they may be ended within a few milliseconds). The controller 24 goes over all recordings that might relate to the ended interaction notified at 901. The procedure commences with the next interaction recording being fetched from the list at operation 903. A decision is made at 904 as to whether the recording is null, i.e. there are no recordings to be fetched because they have already been processed.

The following is performed on every recording: If the recording is not null, a check is made at operation 906 whether this is the first recording in the interaction (it was reported to be the first by the recorder according to the start recording time) If a recording overlaps in time with an interaction (Rec.StopTime>Interaction.StartTime) it can be deduced that it belongs to this interaction. In real time the decision is even simpler. If an interaction exists when a recording session is reported or open—it may relate to this interaction. If yes, the recording will be discarded at operation 908 if it is decided at operation 907 that it is less than a minimum (configurable) duration. If no a check is also made at decision 909 as to whether this is the last recording. This can be done for example by correlating start/stop recording time with start/stop interaction time. If yes, the recording will also be discarded at operation 908 if it is decided at operation 907 that it is less than a minimum duration. If the recording is neither first nor last, it will be added to a list of non-discarded recordings at operation 910. If there is no recording to be fetched to an ended interaction, the flow continues to operation 905 where non discarded-recordings are reported to interaction database 15 and recorder 28.

The flow can be summarized as follows:
Check if it is the first recording in this interaction and it shorter than X sec
If recording.startTime<interaction.startTime AND (recording.stopTime−interaction.startTime<X configurable seconds)→then discard the recording
Check if it the last recording in this interaction and it is shorter than X sec
If Interaction.EndTime−recording.StartTime<X configurable seconds, then discard the recording
The non-discarded recordings will be reported to DB and to the Recorder
Example:
a. Call #1 (Interaction.InteractionID=1) starts at T0→Interaction.StartTime=T0
b. Session #1 starts at T0→Interaction.Recordings[0].StartTime=T0 c. Session #2 starts at T1→the first session is closed and a new one is opened:
   a. Interaction.Recordings[0].EndTime=T1
   b. Interaction.Recordings[1].StartTime=T1
d. Call #1 ends at T2
   a. Interaction.EndTime=T2, Interaction.Recordings[1].EndTime=T2
   b. InteractionDuration>1 sec,
   c. Interaction.Recordings[0].EndTime−Interaction.Recordings[0].StartTime<1 sec
   d. Interaction.Recordings[1].EndTime−Interaction.Recordings[1].StartTime>1 sec
   e. Session #1 is discarded→shorter than x sec (set to 1 sec)
   f. Session #2 reported to DB and Recorder with InteractionID 1 metadata→second recording and longer than 1 sec It will be appreciated from the foregoing that permitting the recorder or recording system to operate independently of the controller ensures that total recording can take place even if the controller is offline or otherwise not available. The recorder creates files based on incoming data, e.g. in the form of RTP packets, only.

The proposed method of operation of the controller ensures that the controller knows about the data files (sessions) as well as the recorder knowing about the interactions.

The problems discussed above are solved by having one component, in this example the controller, responsible for all metadata updates. This ensures that the same metadata is associated with both controller and recorder. The association is done at one point in time, in the examples this point is interaction end. At this point a decision as to which recording belongs to which interaction can be taken.

At the end of an interaction the controller has the whole picture/history of the interaction which may be related to its recordings, so the controller can take the decision.

The recorder operates according to a deterministic algorithm for creating files based on data only. The recorder continues recording (data file creation) even without controller.

The invention presents a new concept in which preferably the controller or optionally another component in a recording system is responsible for metadata association to both an operational database and the recorder database. It also presents a system with the ability for the recorder to act in independent way, whereby even without the controller, the recorder continues recording to files. In this connection it is particularly advantageous for the controller to update the metadata at the end of an interaction.

The controller is the presently preferred part of the system for this responsibility since it is responsible for updating the operational database 15 which may or may not be part of the controller, dealing with metadata, sending events to different applications and controlling interaction flow. It may interface with or report to many other applications that need interaction metadata. In addition, one controller may control multiple recorders. The recorder has only to make sure that an interaction is being recorded and the controller can take care of the metadata.

It will be appreciated that the use of a database at the recording system and/or the controller may facilitate the examination of relationships between, for example, any of the interactions, sessions, streams and recordings. Such a database may comprise anything from a simple table to a complex relational database. The database held at the recording system may contain links to sessions (files).

The methods and systems described above are particularly useful in file based recording where they can be used to create a robust file based recording structure for total recording environments. The files or other content storage structure are created in a real time manner, rather than, for example, being created offline. However it should be noted that the methods and systems described above are not only applicable to file based recording and could, for example, be used in methods and systems where data is recorded in an unformatted stream, e.g. on a disc for later analysis. It should be noted that the recorder data files may include complete metadata or at least sufficient metadata for the files on the recorder to be used even without central storage. The methods and systems described above are especially easy to maintain.

The methods and systems described above will be useful in any situation where there is a need to save data to files, from multiple systems, at high volume. The recording system is particularly useful for compliance, where there is a need to save data to files attach metadata to data files.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Thus an embodiment of the invention may take the form of one or more computer readable media comprising instructions which when executed on one or more processors in a computing system cause the system to implement any of the methods described above.

The aforementioned flowcharts and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, operations or integers or groups thereof and that the terms are to be construed as specifying components, features, steps, operations or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable although flow diagrams may be used to describe embodiments, the invention is not limited to those diagrams or to the corresponding descriptions. For example, flow need not move through each illustrated box or state, or in exactly the same order as illustrated and described.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of recording data relating to calls in a communication system, the communication system comprising multiple endpoints configured to terminate a call, a recording system configured to record call content data from the multiple endpoints, and a controller, the method comprising:
automatically and autonomously, independently of the controller, on receipt of content data from an endpoint, recording at the recording system, in sessions, call content exchanged in calls starting and terminating at the endpoint;
receiving at the controller, from a call exchange, interaction metadata relating to the calls starting and terminating at the endpoint;
receiving at the controller, from the recording system, session notifications relating to sessions that store the call content exchanged in calls starting and terminating at the endpoint; and
matching at the controller, the interaction metadata received from the call exchange to the session notifications received from the recording system.

2. A method according to claim 1 further comprising:
updating an operational database coupled to the controller with the session notifications received from the recording system;
sending from the controller to the recording system interaction metadata relating to calls for which content data is recorded at the recording system; and
updating a recording operational database coupled to the recording system with the interaction metadata sent from the controller.

3. A method according to claim 1 in which the interaction metadata is matched by the controller to the notifications based on one or both of the absolute time of receipt of the notifications and metadata and the time intervals between the receipt of the notifications and metadata.

4. A method according to claim 1 in which the matching of interaction metadata to notifications is initiated at a predetermined point in the flow of information to the controller, or in response to a predetermined notification.

5. A method according to claim 1 in which the interaction metadata received from the call exchange comprises call end notifications and the matching of interaction metadata to notifications is performed by the controller after receipt of a call end notification.

6. A method according to claim 1 in which at least one session comprising content data recorded by the recorder is associated with each call and the method further comprises creating a recording comprising interaction metadata relating to each session.

7. A method according to claim 6 in which the creation of the recording is controlled by the controller.

8. A method according to claim 6 in which each recording comprises additional metadata related to each session which is not stored at the recording system.

9. A method according to claim 1 comprising configuring the recording system for recording of all content data exchanged in the calls created or terminated at the endpoint.

10. A method according to claim 1, wherein one or more sessions corresponds to each call in which content data is transmitted.

11. A method according to claim 10 comprising initiating a new session upon a change of identification data in the received call content data or initiating a new session when content data is received after a predetermined period of not receiving call content data.

12. A method according to claim 10 comprising termination of a session after a predetermined period of not receiving call content data.

13. A method according to claim 1 comprising recording content data relating to different calls in a file structure.

14. A call recording system comprising:
a controller; and
a recording system configured to automatically and autonomously, independently of the controller, record in sessions, call content data relating to calls to and from multiple endpoints, the recording is triggered on receipt of the call content data from one of the endpoints, wherein the controller is configured to:
receive from a call exchange at least some of the interaction metadata relating to the calls to and from the endpoint;
store the interaction metadata;
receive from the recording system session notifications relating to sessions that store the call content exchanged in calls starting and terminating at the endpoint; and
match the interaction metadata received from the call exchange to the session notifications received from the recording system.

15. A call recording system according to claim 14 wherein the recording system is configured to:
recording of all content data exchanged with the endpoint.

16. A call recording system according to claim 14 wherein the controller is configured to receive notifications relating to call content from multiple recording systems each configured to record call content data relating to calls to and from multiple endpoints.

* * * * *